US012124544B2

(12) United States Patent
Steele (10) Patent No.: US 12,124,544 B2
(45) Date of Patent: Oct. 22, 2024

(54) SECURE CALLING CONVENTION SYSTEM AND METHODS

(71) Applicant: AVEVA Software, LLC, Lake Forest, CA (US)

(72) Inventor: Ian Peter George Steele, Cambridgeshire (GB)

(73) Assignee: Aveva Software, LLC, Lake Forest, CA (US)

( * ) Notice: Subject to any disclaimer, the term of this patent is extended or adjusted under 35 U.S.C. 154(b) by 747 days.

(21) Appl. No.: 16/566,035

(22) Filed: Sep. 10, 2019

(65) Prior Publication Data

US 2020/0082060 A1 Mar. 12, 2020

Related U.S. Application Data

(60) Provisional application No. 62/729,334, filed on Sep. 10, 2018.

(51) Int. Cl.
| | | |
|---|---|---|
| *G06F 21/60* | (2013.01) | |
| *G06F 9/54* | (2006.01) | |
| *G06F 21/14* | (2013.01) | |
| *H04L 9/08* | (2006.01) | |
| *G06F 21/10* | (2013.01) | |

(52) U.S. Cl.
CPC ............... *G06F 21/14* (2013.01); *G06F 9/54* (2013.01); *G06F 21/602* (2013.01); *H04L 9/0861* (2013.01); *G06F 21/1066* (2023.08)

(58) Field of Classification Search
CPC .......... G06F 21/14; G06F 9/54; G06F 21/602; G06F 2221/0748; H04L 9/0861
See application file for complete search history.

(56) References Cited

U.S. PATENT DOCUMENTS

| | | | |
|---|---|---|---|
| 7,545,931 B2 * | 6/2009 | Dillaway | H04L 9/0894 380/44 |
| 2003/0194085 A1 | 10/2003 | Dillaway | |
| 2014/0301547 A1 | 10/2014 | Brown | |
| 2016/0117262 A1 * | 4/2016 | Thom | H04L 9/0822 713/189 |
| 2016/0162688 A1 | 6/2016 | Call et al. | |
| 2016/0219055 A1 * | 7/2016 | Hilliar | H04L 9/3228 |

(Continued)

FOREIGN PATENT DOCUMENTS

| | | | | |
|---|---|---|---|---|
| WO | 2008036919 A2 | 3/2008 | | |
| WO | WO-2011151734 A2 * | 12/2011 | ......... | H04L 63/0464 |

OTHER PUBLICATIONS

International Search Report and Written Opinion for corresponding International Application No. PCT/US2019/050446 dated Jun. 26, 2020, 10 pages.

*Primary Examiner* — Ali S Abyaneh
*Assistant Examiner* — Lydia L Noel
(74) *Attorney, Agent, or Firm* — Dergosits & Noah LLP; Todd A. Noah (57) ABSTRACT

The present disclosure is directed to systems and methods for protecting software application information that is passed between a caller of an API and the logic contained within the API by using a Secure Calling Convention (SCC). The SCC involves performing a cryptographic operation on the information such that the true nature of the information is obfuscated. The SCC prevents a hacker from using the information to reverse-engineer the software application to behave as desired.

20 Claims, 9 Drawing Sheets

(56) References Cited

U.S. PATENT DOCUMENTS

| | | |
|---|---|---|
| 2017/0272462 A1 | 9/2017 | Kraemer et al. |
| 2017/0322836 A1* | 11/2017 | Ionescu ..................... G06F 9/54 |
| 2017/0357817 A1* | 12/2017 | Tamura ..................... H04L 9/14 |
| 2020/0304492 A1* | 9/2020 | Nordstrom ............ H04L 63/068 |

* cited by examiner

SECURE CALLING CONVENTION SYSTEM AND METHODS

CROSS REFERENCE TO RELATED APPLICATION

This application claims the benefit of and priority to U.S. Provisional Patent Application No. 62/729,334, filed on Sep. 10, 2018, entitled "SECURE CALLING CONVENTION SYSTEM AND METHOD" which is hereby incorporated by reference for all purposes.

BACKGROUND

Existing cryptographic systems and methods for protecting software suffer from a number of disadvantages. A major disadvantage is that existing cryptographic systems and methods leaves software vulnerable to attack. One of the most common attacks involves modifying the software to gain access to an unlicensed version of a software application. Hackers can use unencrypted portions of the application to determine how encrypted portions of the software behave. The unencrypted portion of the application is often part of a calling convention for an Application Programming Interface (API). Unprotected values passed to and returned from the API present opportunities for hackers to use information gleaned from those values to force the software application to behave as desired.

Hackers seek to modify software so that it behaves differently from how the original authors intended, either for personal interest, kudos in the hacking community, profit, and/or malicious intent. One of the tools that a hacker uses on a software application or system is reverse-engineering, which is a term used to describe a process of deconstructing a system in order to understand how it achieves its intended function. When hackers attempt to modify the behavior of software, they will usually need to reverse-engineer the software logic in order to understand how the software works before they can devise an attack. Hackers will reverse-engineer software functionality at least to the point whereby they are able to modify the behavior in the manner they desire.

The most intuitive method of understanding how a piece of software works is to look at all of its logic in some detail. Such an approach can be very time-consuming especially if the logic is performing a laborious or complicated task because there will be a very large amount of intricate logic. Such an approach is generally considered unviable unless a team of hackers collaborate. A more time-effective approach is to identify the APIs within the software which will provide a high-level overview of how the software works. Hence a major goal of the process of reverse-engineering software is the identification of API entry points and subsequent analysis of their functionality.

There are many freely available software tools that assist with the task of reverse-engineering, and hackers usually rely on such tools to achieve their goal. Two of the most common tools used by hackers are:

(i) Debuggers: they allow a hacker to observe in detail the behavior of software Logic while it is running and also interact and experiment with the running software.

(ii) De-compilers: they automatically analyze software Logic and report locations and details of API's and other information.

Often a simpler and faster approach to gaining an understanding how a piece of software functions is to use the aforementioned tools to establish some or all of the following information:

(a) Identify parts of the software logic that are likely to represent API entry-points.
(b) Determine the context in which API's are called from elsewhere in the software.
(c) Determine the nature of the parameters that are passed to an API.
(d) Determine the nature of the results returned by an API or the changes made to data after the API has completed.

For example, considering (c) and (d) above, if an API is seen to accept any two numbers as parameters and consistently returns the sum of those two numbers, an observer may quickly and reasonably deduce that the API adds two numbers together, this being achieved without the need to reverse-engineer the API logic. This example emphasizes the usefulness of being able to observe the information being passed between an API and its caller.

Once a hacker is confident that enough information has been obtained to hack the software an attack is devised of which there are two main types:

(i) Modification of the software logic itself.
(ii) Modification of the operating environment to exploit a flaw in the software logic.

Hackers often focus on the licensing functionality in a product that requires users to pay for a license in order to use that product. It is not possible to protect licensing API's in products without the use of software protection tools. Protection tools commonly use one of two types of protection technique:

(I) Whole-Program Protection: Protects an Entire Application.
  a. Advantages: provides excellent all-round protection; API's are hidden; API logic is protected.
  b. Disadvantages: impact on performance cannot be controlled which means it is not viable to use such tools to protect performance-critical products.

(II) Selective Protection: Allows Specific Parts of an Application to be Protected.
  a. Advantages: performance-critical parts can be left unprotected and hence performance impact can be controlled; API logic is protected.
  b. Disadvantages: API's are not hidden which is a critical issue when protecting licensing API's because they must be hidden.

Selective protection is highly desirable for many products on the basis that there is usually a need to control the performance-impact. However, selective protection is not suitable for protecting Licensing API's as the API's are left exposed, allowing a hacker to replace those API's with a simple stub that always returns a value to the application indicating that it is licensed when in fact it is not. The example below demonstrates such a scenario:

Step 1: Assume an application contains a licensing API called "IsLicensed" that always returns 0 when the application is licensed and a non-zero value when it is not licensed.

Step 2: Assume that the application logic executes the IsLicensed API and is coded so that when the IsLicensed API returns anything other than 0 the application will terminate.

Step 3: When the application is protected with selective protection, an attacker will not be able to "see" inside the IsLicensed API and determine the logic contained inside it, however an attacker has no need to. It is only sufficient for the attacker to see that whenever the API returns 0 the application will not terminate.

Step 4: After discovering the required return value in step 3, the attacker will know that to disable the licensing it is only necessary to produce a simple stub to overwrite the IsLicensed API with logic that always returns 0 to disable the licensing functionality.

As can be seen in the above example, selective protection does not help to protect licensing functionality although it does protect the actual implementation logic and any intellectual property inside the licensing API's.

Therefore, there is a need to provide a cryptographic system for API values that overcome the disadvantages of the prior art.

SUMMARY

The present disclosure is directed to systems and methods for a secure calling convention (SCC) to protect information passed between a caller of an API and the logic contained within the API.

In some embodiments, an application programming interface ("API") comprises without limitation a piece of computer logic that performs a particular piece of functionality (e.g., adding two numbers together). According to some embodiments, an API comprises without limitation a set of computer executable instructions stored on a transitory and/or non-transitory computer readable medium that when executed allows access to programs such as, but not limited to, an operating system, application, or service, and also facilitates the interaction between those programs. In various embodiments "attributes" of an API and/or value comprises without limitation any feature associated therewith including but not limited to parameter values, return values, BLOBs, memory location, memory size, logic, etc. A location can also be referred to as the "entry-point". If the API requires parameters to be supplied by the API caller, then those parameters can be supplied in a pre-defined format at a location in computer memory that is known to both the API and the API caller. Further, if the API needs to pass information back to the API caller then that information can be stored in computer memory in a format and at a location that is known to the API caller (e.g., the result of adding two numbers together). As used in some embodiments, an "API caller" can comprise without limitation computer executable instructions that causes the execution of API logic. As used herein, an "API logic" is logic that implements the functionality advertised by the API.

If one or more embodiments of the SCC disclosed herein is applied to the IsLicensed API and the above example is repeated, the attack at step 4 would no longer succeed. The reason is that at step 3 the attacker would not be able to determine the return value required to produce a stub because the use of encryption means that the returned value will be different each time. In order to successfully produce a stub the attacker would have to reverse-engineer the protected code which would be extremely difficult and time consuming.

When used in conjunction with selective protection, the SCC makes it extremely hard for an attacker to compromise a licensing API or indeed any API. This is because the randomness that is used to encrypt the API arguments (e.g., parameters, return values, etc.) prevents the attacker from being able to overwrite a protected licensing API with a simple "stub" that always returns the same value to the product.

Some embodiments comprise preventing casual observation by a hacker of API parameters passed into an API logic by an API caller while the application logic is being executed by the process of encrypting the parameter values before the API is called by the API caller.

Some embodiments comprise preventing casual observation of the data returned by an API to an API caller while the application logic is being executed by the process of encrypting that data before it is returned to the API caller by the API.

Some embodiments include encrypting an API parameter using an encryption key derived from a source or sources of entropy prior to the parameter being passed to the API logic by the API Caller such that when the API logic queries the source or sources of entropy, the API logic can derive a decryption key that can be used to decrypt the previously encrypted parameter.

Some embodiments include encrypting the data returned by an API to an API caller using an encryption key derived from a source or sources of entropy prior to the parameter being passed to the API logic by the API caller such that when the API caller queries the source or sources of entropy, the API caller can derive a decryption key that can be used to decrypt the previously encrypted parameter.

Some embodiments include preventing casual tampering of the functionality of an API that accepts input parameters but does not return data to its caller, by using encryption of API parameters so that more time must be spent reverse-engineering the API logic than would be required without the use of the system.

Some embodiments include preventing casual tampering of the functionality of an API that accepts input parameters and also returns data to its caller, by using encryption of API parameters and the returned data so that more time must be spent reverse-engineering the API logic than would be required without the use of the system.

Some embodiments include preventing casual tampering of the functionality of an API that does not accept input parameters but does return data to its caller, by using encryption of the returned data so that more time must be spent reverse-engineering the API logic than would be required without the use of the system.

Some embodiments include preventing casual replacement of an API by encrypting its input parameters, if it accepts any, and its returned data, if it returns any, so that more time must be spent reverse-engineering the API logic than would be required without the system.

Some embodiments include a method of deriving entropy from a source of entropy by an API caller such that the API logic when called by the API caller can independently obtain entropy to the extent where it can create a decryption key that can be used to decrypt the encrypted parameters passed to it by the API caller.

BRIEF DESCRIPTION OF DRAWINGS

Certain embodiments of the invention will now be described by way of example, with reference to the accompanying drawings, in which.

DETAILED DESCRIPTION

Embodiments of the present disclosure are directed systems and methods to protect information passed between a caller of an API and the logic contained within the API using the SCC.

To this end, in various embodiments, protecting information comprises the information undergoing a cryptographic operation. According to some embodiments, a "cryptographic operation" comprises without limitation a set of instructions stored on a transitory and/or non-transitory computer readable medium that when executed results in the encryption or decryption of information or one or more parts thereof.

As used herein, according to some embodiments, "encryption" is a process that transforms information from its original form into a form whereby the original form is no longer observable. In some embodiments, Encryption requires the use of an encryption key that is used govern the transformation. As used herein, in various embodiments, an "encryption key" is a value used by an encryption process when transforming information into an encrypted form.

As used herein, in some embodiments, a "decryption" comprises without limitation a process that transforms previously encrypted information into its original form. According to some embodiments, decryption requires the use of a decryption key. As used herein, in some embodiments, a "decryption key" comprises without limitation a value that is required to transform previously encrypted information into its original form.

In some embodiments, the encryption key can have a matched decryption key that allows the encrypted information to be decrypted.

As used herein, in various embodiments, "entropy" comprises, without limitation, data that cannot easily be predicted and so can be considered random for the purposes that it will be used for. As used herein, in some embodiments, an "entropy source" comprises without limitation an identifiable resource that produces entropic values.

Parameter Cryptographic Operations

Figure 1:
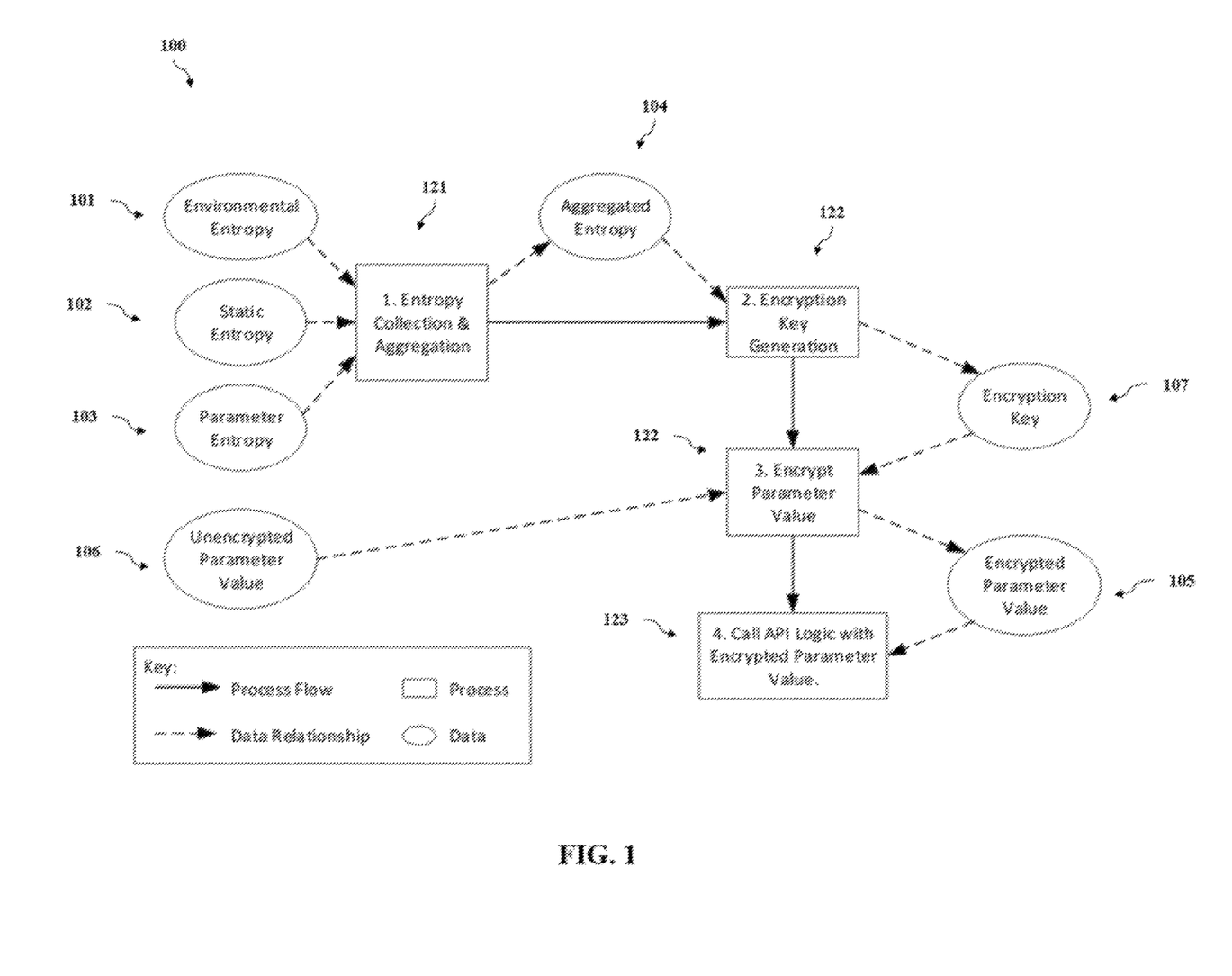
FIG. 1 is a schematic block diagram of the process that an API caller undertakes when passing an encrypted parameter to API logic in accordance with some embodiments of the invention.

FIG. 1 is a schematic block diagram 100 of some SCC embodiments where an API caller passes (i.e., sends) an encrypted parameter 105 to an API.

Embodiments comprising the SCC process shown in FIG. 1 comprise entropy collection and aggregation 121 at step 1. In various embodiments, entropy is collected from various sources such as environmental entropy 101, static entropy 102, and parameter entropy 103 (each further defined in a later section). The aggregated entropy 104 is then used for encryption key generation 122 at step 2 in some embodiments. At step 3, in various embodiments, the encryption key 107 generated at step 2 is used to encrypt the unencrypted API parameter values 106, which results in an encrypted API parameter value 105. An API calling operation 123 is then executed where the encrypted API parameter 105 is passed to the API in some embodiments.

Thus, some embodiments using the SCC illustrated in FIG. 1 prevent casual observation by a hacker of one or more unencrypted API parameters 106 while an application is being executed.

Figure 2:
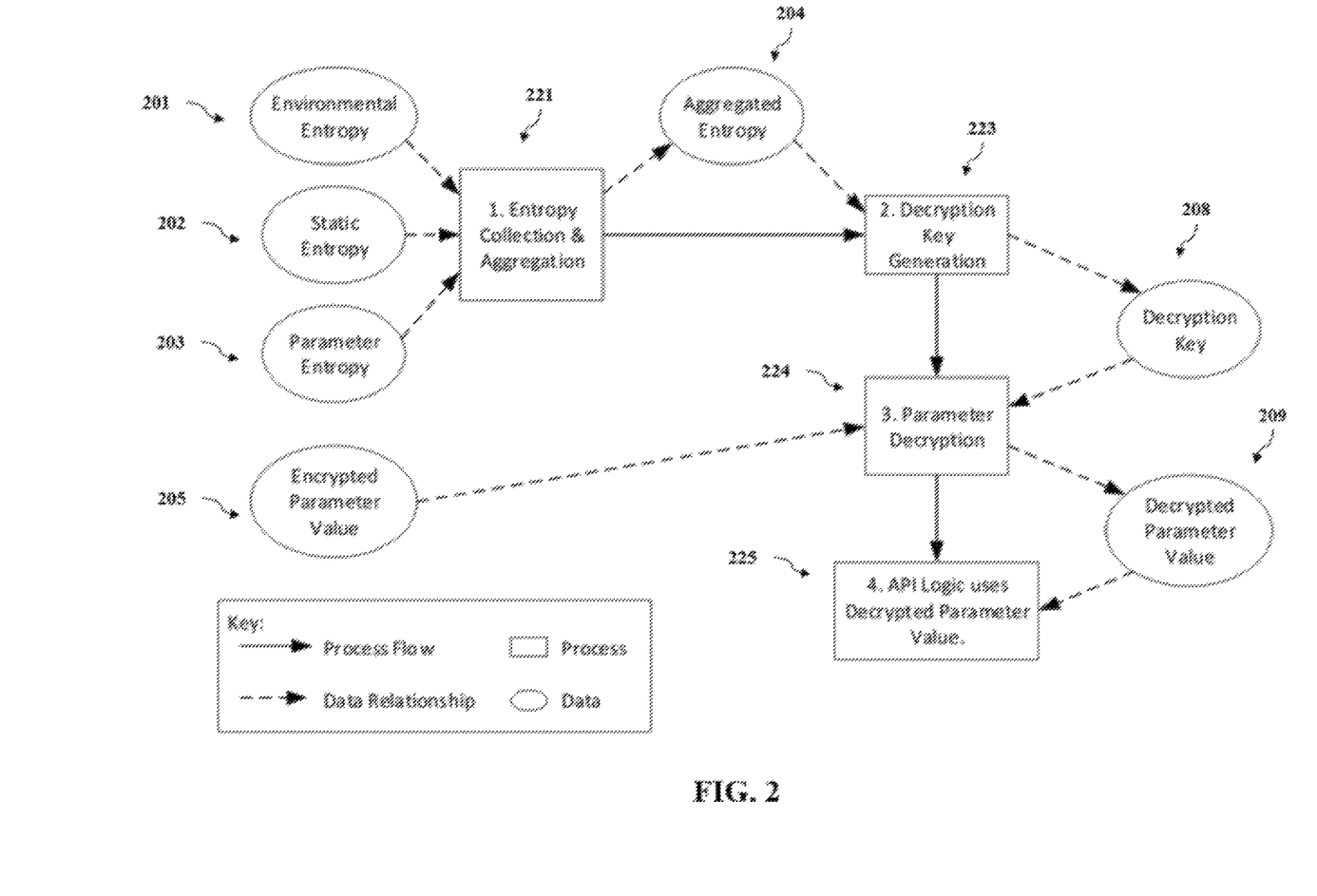
FIG. 2 is a schematic block diagram of the process that API logic undertakes when decrypting an encrypted parameter passed to it by an API caller in accordance with some embodiments of the invention.

FIG. 2 is a schematic block diagram 200 used in some SCC embodiments for decrypting an encrypted parameter 205 that has been passed by an API caller, so that the decrypted parameter 209 can be used by the API's logic.

Embodiments comprising the SCC process shown in FIG. 2 comprise entropy collection and aggregation 221 at step 1. In various embodiments, entropy is collected from various sources such as environmental entropy 201, static entropy 202, and parameter entropy 203. The aggregated entropy 204 is then used in some embodiments for decryption key generation 223 at step 2. At step 3, in various embodiments, the decryption key 208 generated at step 2 is used to decrypt the encrypted API parameter values 205. The decrypted API parameter value 209 is then used 225 by the API logic at step 4 in some embodiments.

BLOB-Parameter Cryptographic Operations

Figure 3:
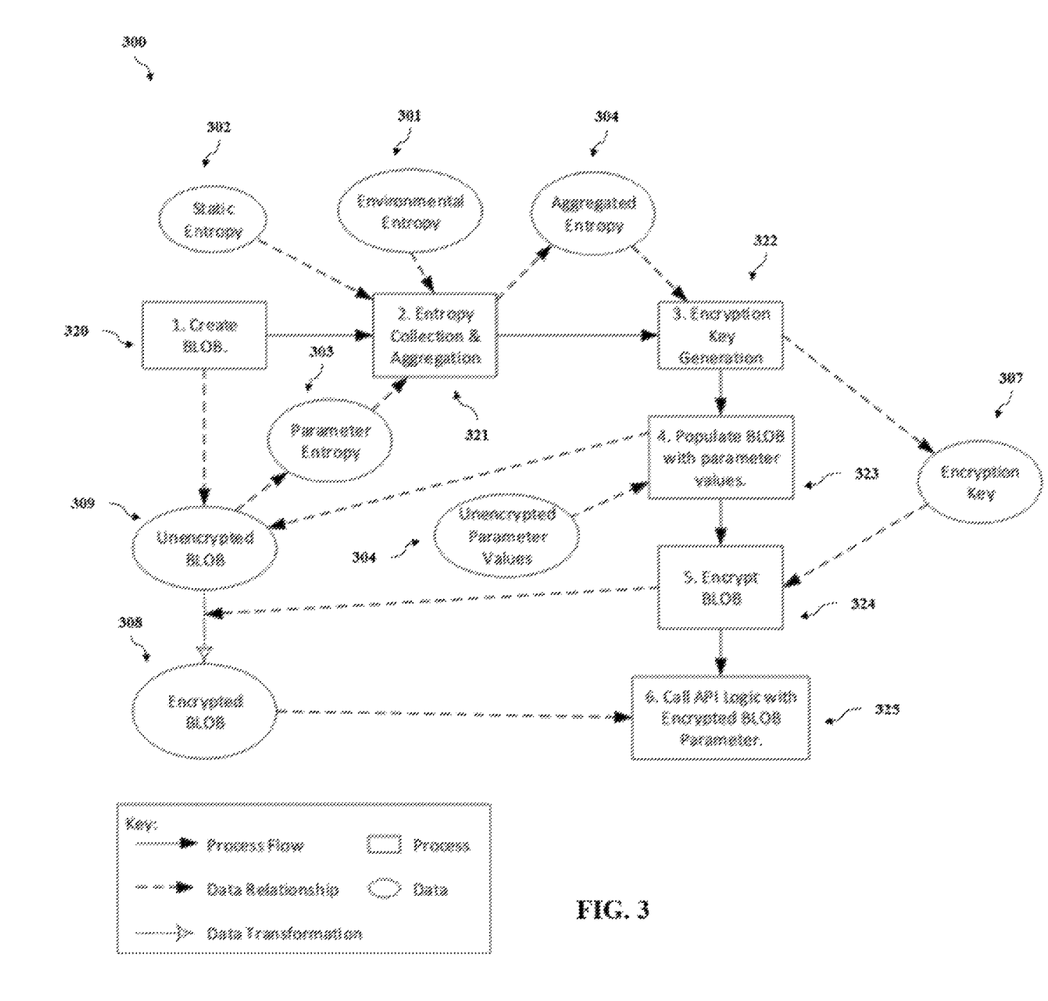
FIG. 3 is a schematic block diagram of the process that API caller logic undertakes when passing encrypted parameters in a BLOB to an API in accordance with some embodiments of the invention.

FIG. 3 is a schematic block diagram 300 of some SCC embodiments where an API caller passes an encrypted binary large object (BLOB) 308 to an API.

Embodiments comprising the SCC process shown in FIG. 3 comprise BLOB creation 320 of an unencrypted BLOB 309 at step 1. At step 2, in some embodiments, entropy is collected from various sources such as environmental entropy 301, static entropy 302, and parameter entropy 303. In various embodiments, parameter entropy 303 comprises one or more attributes associated with the unencrypted BLOB. In some embodiments, the aggregated entropy 304 generated at step 2 is used for encryption key generation 322 to create an encryption key 307 at step 3. At step 4, according to some embodiments, the unencrypted BLOB 309 is populated with unencrypted parameter values 304. At step 5, the unencrypted BLOB 309 with the unencrypted parameter values 304 undergo encryption 324 using the encryption key 307 in some embodiments. According to some embodiments, an API calling operation 325 is then executed where the encrypted BLOB 308 is passed to the API.

Thus, some embodiments using the SCC illustrated in FIG. 3 prevent casual observation by a hacker of one or more unencrypted BLOBs 309 and/or unencrypted parameter values 304 while a software application is being executed.

Figure 4:
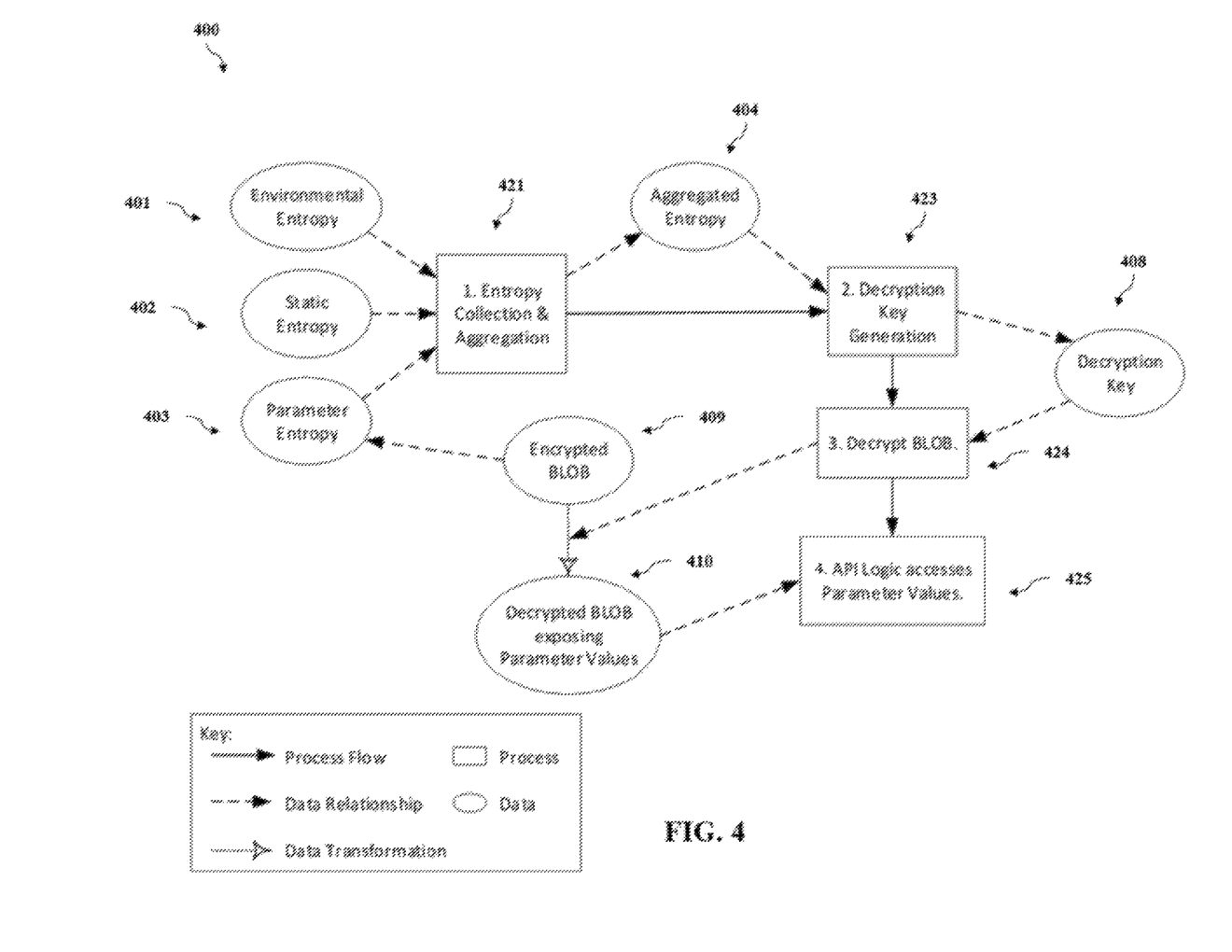
FIG. 4 is a schematic block diagram of the process that API logic undertakes when decrypting an encrypted BLOB that has been passed to it by an API caller in accordance with some embodiments of the invention.

FIG. 4 is a schematic block diagram 400 used in some SCC embodiments for decrypting an encrypted BLOB 409 that has been passed by an API caller, so that the parameter values within decrypted BLOB 410 can be accessed 425 by the API's logic.

Embodiments comprising the SCC process shown in FIG. 4 begin with entropy collection and aggregation 421 at step 1. In various embodiments, entropy is collected from various sources such as environmental entropy 401, static entropy 402, and parameter entropy 403. In various embodiments, parameter entropy 403 comprises one or more attributes associated with the encrypted BLOB 409. The aggregated entropy 404 is then used in some embodiments for decryption key generation 423 at step 2. At step 3, in various embodiments, the decryption key 408 generated at step 2 is used to decrypt the encrypted BLOB 409. The parameter values within the decrypted BLOB 410 are then accessed 425 by the API logic at step 4 according to some embodiments.

Return Cryptographic Operations

Figure 5:
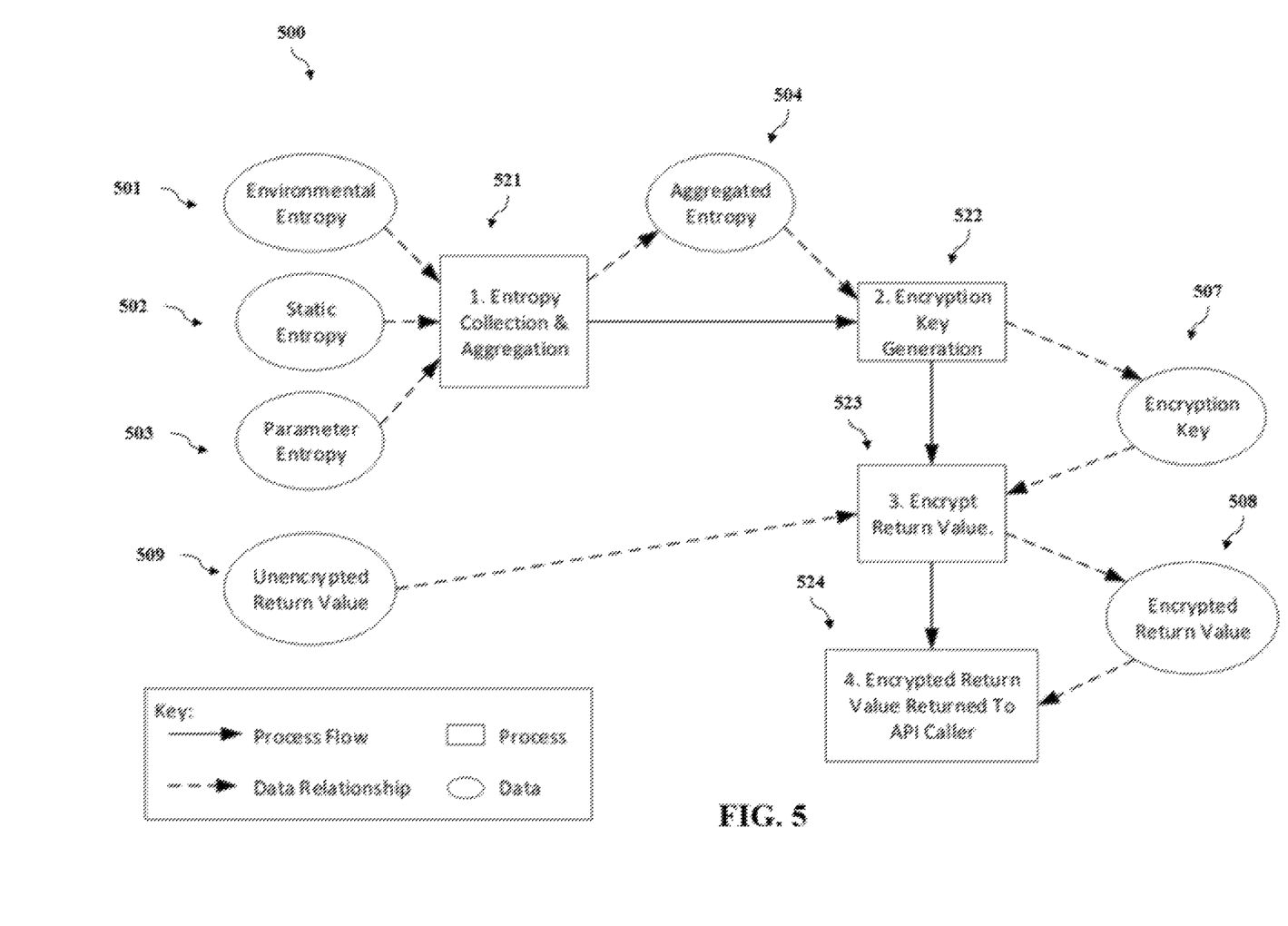
FIG. 5 is a schematic block diagram of the process that API logic undertakes when it encrypts one or more values that it returns to an API caller in accordance with some embodiments of the invention.

FIG. 5 is a schematic block diagram 500 of some SCC embodiments where an API returns an encrypted return value 508 to an API caller.

Embodiments comprising the SCC process shown in FIG. 5 comprise entropy collection and aggregation 521 at step 1. In various embodiments, entropy is collected from various sources such as environmental entropy 501, static entropy 502, and parameter entropy 503. The aggregated entropy 504 is then used for encryption key generation 522 at step 2 in some embodiments. At step 3, in various embodiments, the encryption key 507 generated at step 2 is used to encrypt the unencrypted API return values 509 which results in an encrypted API return value 508. An API return operation 524 is then executed where the encrypted API return value 508 is returned to the API caller according to some embodiments.

Thus, some embodiments using the SCC illustrated in FIG. 5 prevent casual observation by a hacker of unencrypted API return values 509 while an application is being executed.

Figure 6:
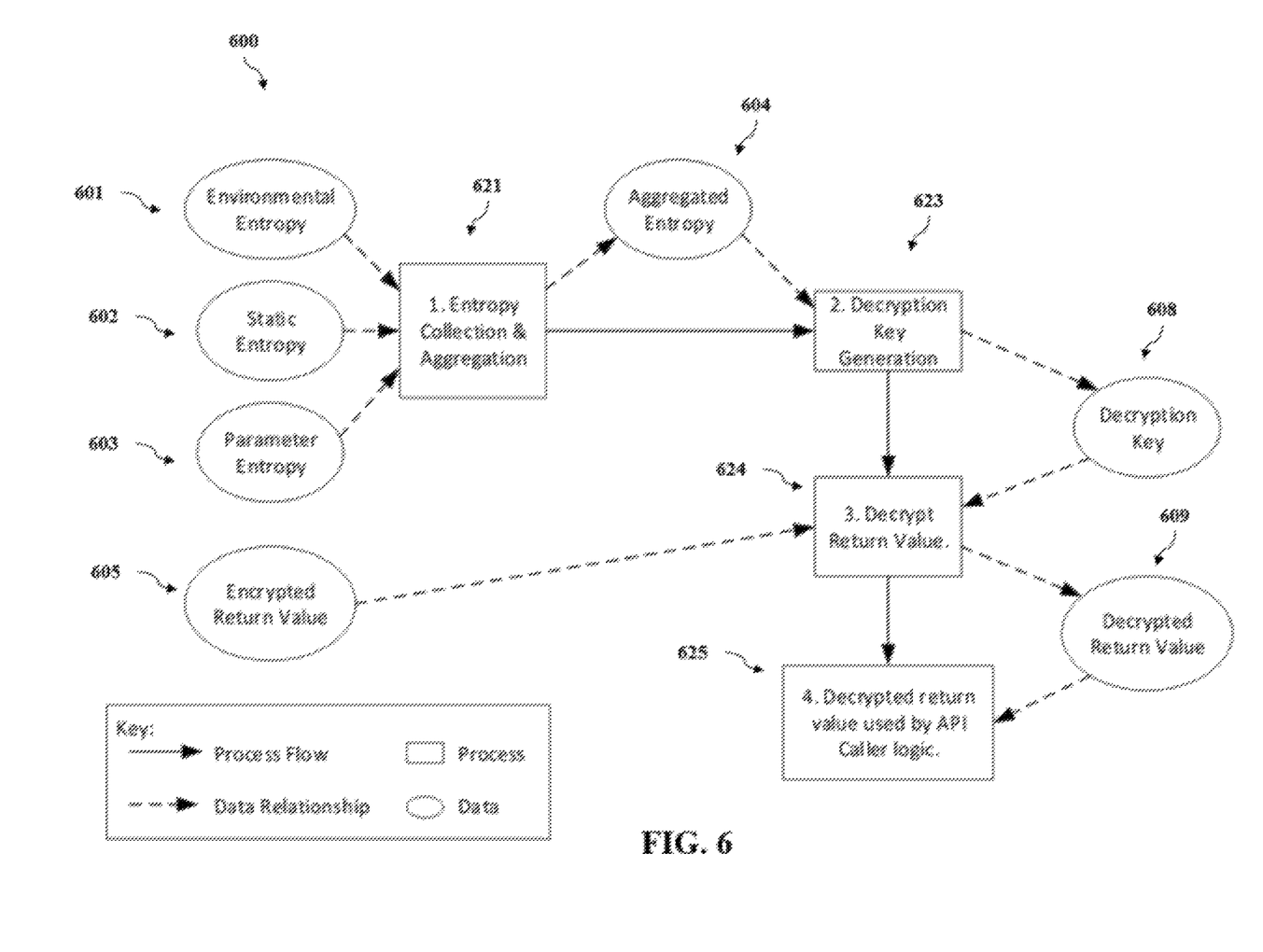
FIG. 6 is a schematic block diagram of the process that API caller logic undertakes when it decrypts one or more encrypted values returned by an API in accordance with some embodiments of the invention.

FIG. 6 is a schematic block diagram 600 used in some SCC embodiments for decrypting an encrypted API return value 605, so that the decrypted return value 609 can be used by the API's caller.

Embodiments comprising the SCC process shown in FIG. 6 begin with entropy collection and aggregation 621 at step 1. In various embodiments, entropy is collected from various sources such as environmental entropy 601, static entropy 602, and parameter entropy 603. The aggregated entropy 604 is then used in some embodiments for decryption key generation 623 at step 2. At step 3, in various embodiments, the decryption key 608 generated at step 2 is used to decrypt the encrypted API return values 605. The decrypted API return value 609 is then used 625 by the API caller logic at step 4 in some embodiments.

BLOB-Return Cryptographic Operations

Figure 7:
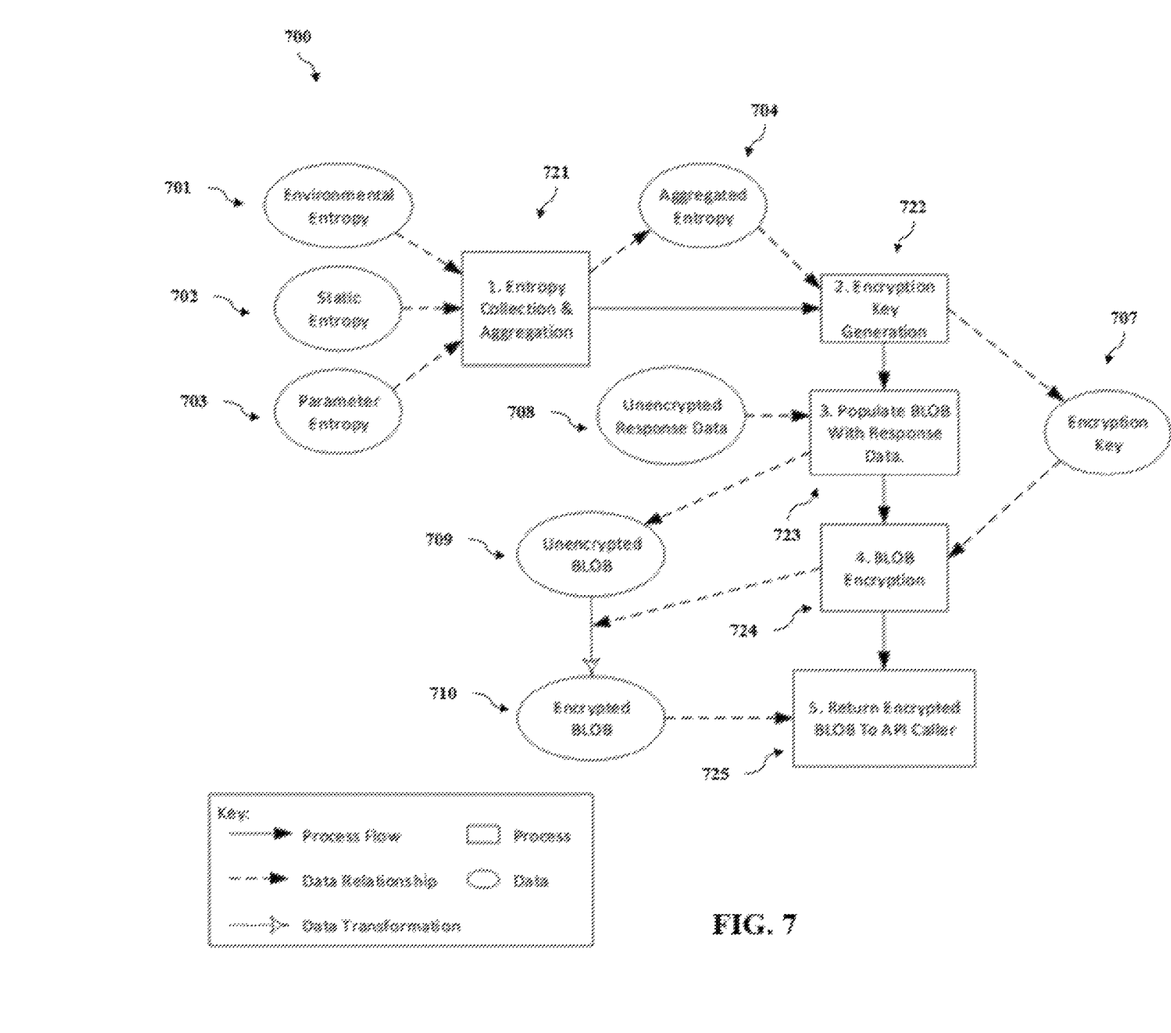
FIG. 7 is a schematic block diagram of the process that API logic undertakes when it encrypts a BLOB containing data to be returned to an API caller in accordance with some embodiments of the invention.

FIG. 7 is a schematic block diagram 700 of some SCC embodiments where an API returns an encrypted BLOB 710 to an API caller.

Embodiments comprising the SCC shown in FIG. 7 comprises a BLOB creation (not shown) of an unencrypted BLOB 709. At step 1, in some embodiments, entropy is collected from various sources such as environmental entropy 701, static entropy 702, and parameter entropy 703. In various embodiments, parameter entropy 703 comprises one or more attributes associated with the unencrypted BLOB 709. In some embodiments, the aggregated entropy 704 generated at step 1 is used for encryption key generation 722 at step 2 to create an encryption key 707. At step 3, according to some embodiments, the unencrypted BLOB 709 is populated with unencrypted return values 708. At step 4, in various embodiments, the unencrypted BLOB 709 with the unencrypted return values 708 undergoes encryption 724 using the encryption key 707. An API return operation 725 is then executed where the encrypted BLOB 710 is returned to the API caller according to some embodiments.

Thus, some embodiments using the SCC illustrated in FIG. 7 prevent casual observation by a hacker of unencrypted response data 708 in an unencrypted BLOB 709 being returned to an API caller while an application is being executed.

Figure 8:
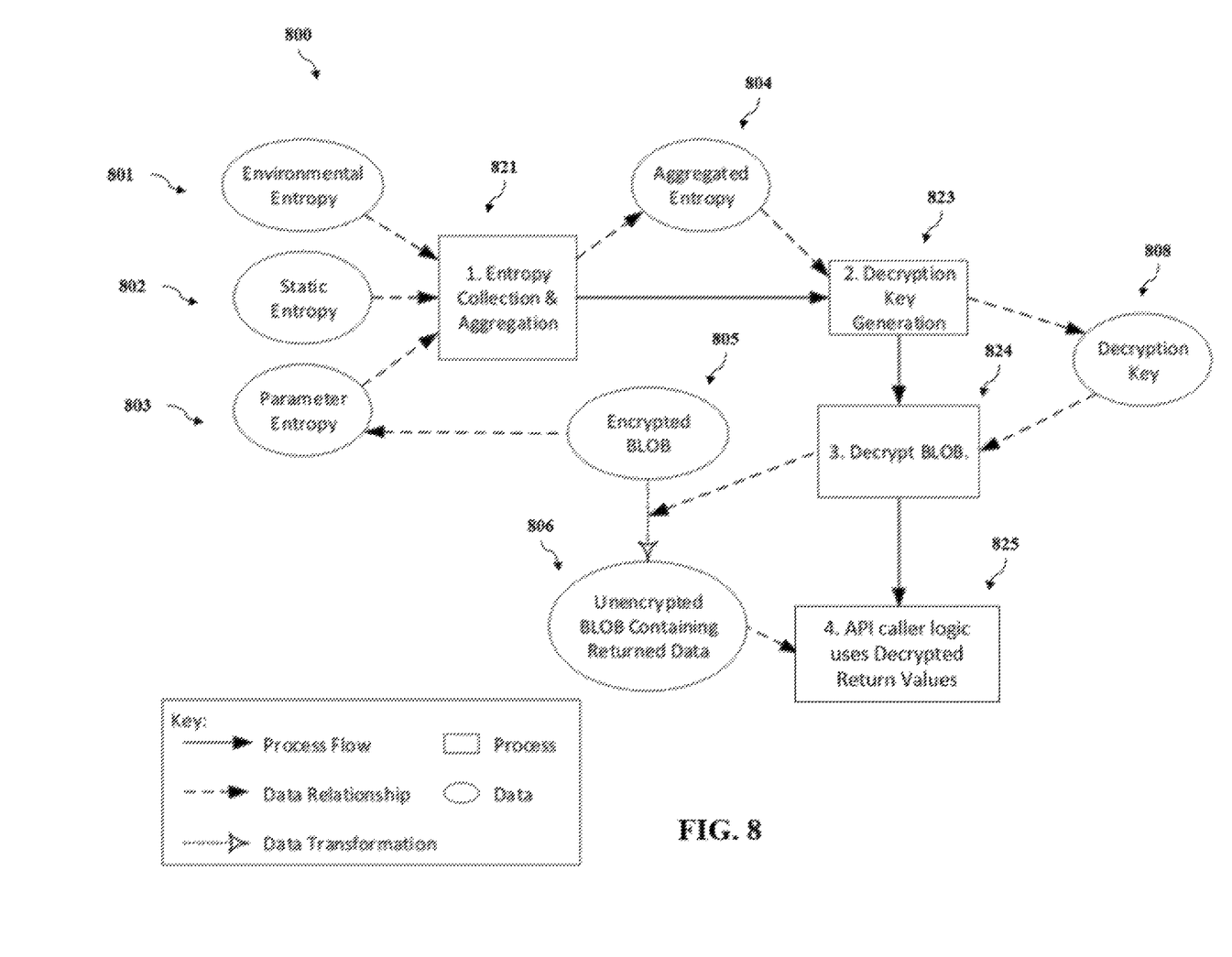
FIG. 8 is a schematic block diagram of the process that API caller logic undertakes when it decrypts an encrypted BLOB returned by an API in accordance with some embodiments of the invention.

FIG. 8 is a schematic block diagram 800 used in some SCC embodiments for decrypting an encrypted BLOB 805 that has been returned to an API caller, so that the return values within decrypted BLOB 806 can be accessed 825 by the API caller logic.

Embodiments comprising the SCC process shown in FIG. 7 comprises a BLOB creation (not shown) of an encrypted BLOB 805. In some embodiments, entropy collection and aggregation 821 occurs at step 1. In various embodiments, entropy is collected from various sources such as environmental entropy 801, static entropy 802, and parameter entropy 803. In various embodiments, parameter entropy 803 comprises one or more attributes associated with the encrypted BLOB 805. The aggregated entropy 804 is then used in some embodiments for decryption key generation 823 at step 2. At step 3, in various embodiments, the decryption key 808 generated at step 2 is used to decrypt the encrypted BLOB 805. The parameter values within the decrypted BLOB 806 are then accessed 825 by the API caller logic at step 4 according to some embodiments.

In some embodiments, the SCC requires the identification of parameter values prior to their encryption but not prior to generation of entropy used for key generation if parameter entropy is not used for key generation.

In some embodiments, the system requires identification of parameter values prior to their encryption and prior to the generation of entropy used for key generation if parameter entropy is used for key generation.

In some embodiments, the system allows entropy used for encrypting returned data to be optionally be derived from encrypted parameter data when a contract of understanding exists to that effect between the API logic and the API caller. In some embodiments, such entropy can be derived from one or more decrypted parameter values that have either been provided explicitly for that purpose or derived from other parameters that have an alternative purpose not related to the system.

In some embodiments, the system requires entropy sources to reproduce identical values when used by the API caller and the API when it is called by the API caller in a calling sequence. In some embodiments, entropy sources do not produce repeated values on subsequent calling sequences.

In some embodiments, the system requires that implementation follows the order shown in the process flows of FIGS. 1-9.

In some embodiments, the system will function correctly when non-system related logic is present between any consecutive process steps in the process flows of FIGS. 1-9.

In some embodiments, the system will function correctly when non-system related logic present between any consecutive process steps does not interfere with the data or entropy sources upon which the system is dependent.

In some embodiments, the system allows parameter value encryption to be applied to multiple parameters when an API accepts more than one parameter.

Application System Architecture

Figure 9:
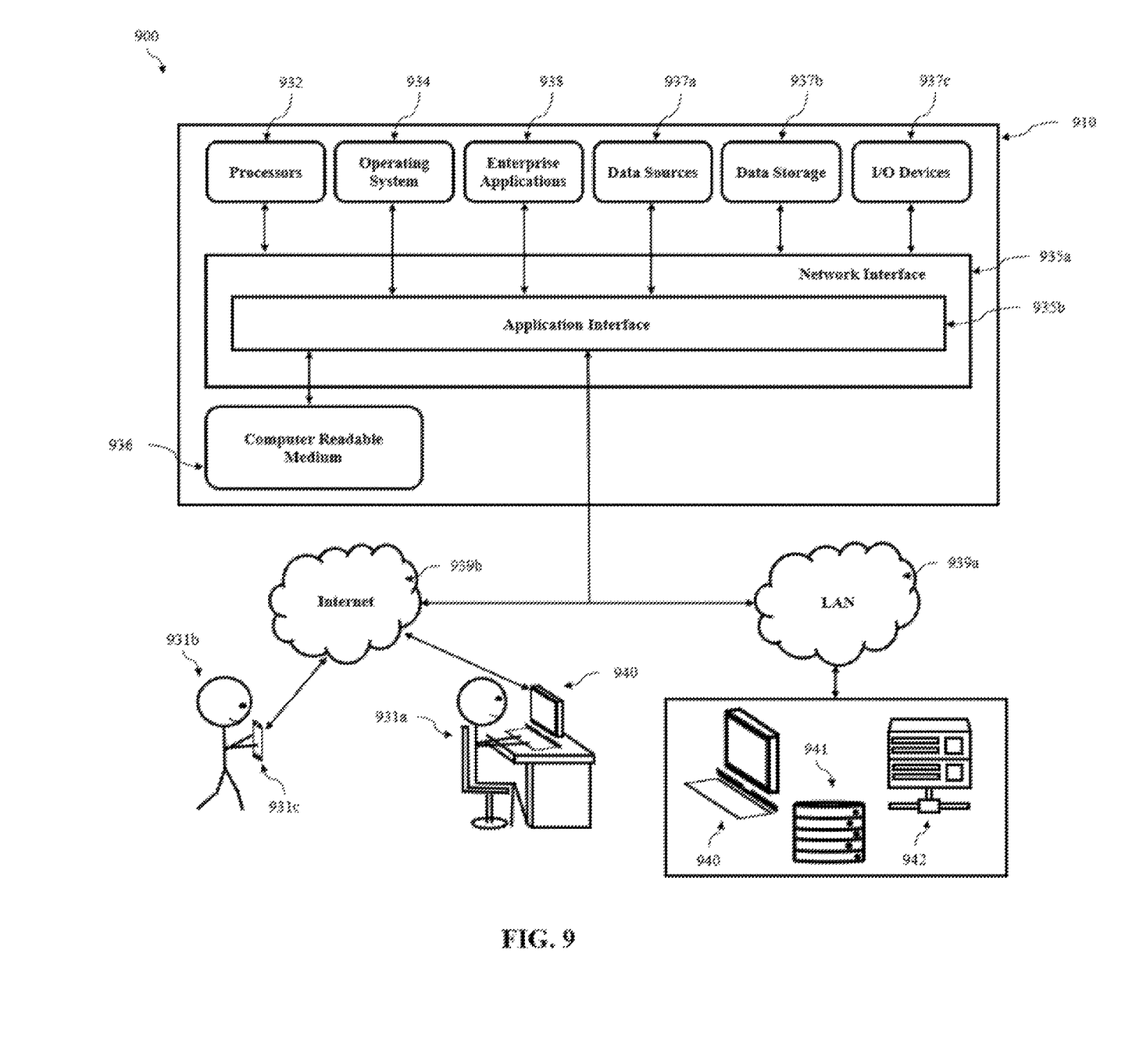
FIG. 9 illustrates the system architecture of a computer system enabling or comprising the systems and methods in accordance with some embodiments of the system.

FIG. 9 illustrates a system architecture 900 of a computer system 910 enabling or comprising the systems and methods in accordance with some embodiments of the system. In some embodiments, the computer system 910 can operate and/or process computer-executable code of one or more software modules of the aforementioned system and method. Further, in some embodiments, the computer system 910 can operate and/or display information within one or more graphical user interfaces (e.g., HMIs) integrated with or coupled to the system.

In some embodiments, the system 910 can comprise at least one computing device including at least one processor 932. In some embodiments, the at least one processor 932 can reside in, or coupled to, one or more server platforms (not shown). In some embodiments, the system 910 can include a network interface 935a and an application interface 935b coupled to the least one processor 932 capable of processing at least one operating system 934. Further, in some embodiments, the interfaces 935a, 935b coupled to at least one processor 932 can be configured to process one or more of the software modules (e.g., such as enterprise applications 938). In some embodiments, the software modules can include server-based software, and can operate to host at least one user account and/or at least one client account, and operating to transfer data between one or more of these accounts using the at least one processor 932.

With the above embodiments in mind, it should be understood that the system can employ various computer-implemented operations involving data stored in computer systems. Moreover, the above-described databases and models described throughout can store analytical models and other data on computer-readable storage media within the system 910 and on computer-readable storage media coupled to the system 910. In addition, the above-described applications of the system can be stored on computer-readable storage media within the system 910 and on computer-readable storage media coupled to the system 910. These operations are those requiring physical manipulation of physical quantities. Usually, though not necessarily, these quantities take the form of electrical, electromagnetic, or magnetic signals, optical or magneto-optical form capable of being stored, transferred, combined, compared and otherwise manipulated. In some embodiments, the system 910 can comprise at least one computer readable medium 936 coupled to at least one data source 937a, and/or at least one data storage device 937b, and/or at least one input/output device 937c. In some embodiments, the system can be embodied as computer readable code on a computer readable medium 936. In some embodiments, the computer readable medium 936 can be any data storage device that can store data, which can thereafter be read by a computer system (such as the system 910). In some embodiments, the computer readable medium 936 can be any physical or material medium that can be used to tangibly store the desired information or data or instructions and which can be accessed by a computer or processor 932. In some embodiments, the computer readable medium 936 can include hard drives, network attached storage (NAS), read-only memory, random-access memory, FLASH based memory, CD-ROMs, CD-Rs, CD-RWs, DVDs, magnetic tapes, other optical and non-optical data storage devices. In some embodiments, various other forms of computer-readable media 936 can transmit or carry instructions to a computer 940 and/or at least one user 931, including a router, private or public network, or other transmission device or channel, both wired and wireless. In some embodiments, the software modules 938 can be configured to send and receive data from a database (e.g., from a computer readable medium 936 including data sources 937a and data storage 937b that can comprise a database), and data can be received by the software modules 938 from at least one other source. In some embodiments, at least one of the software modules can be configured within the system to output data to at least one user 931a, 931b via at least one graphical user interface rendered on at least one digital display.

In some embodiments, of the system, the computer readable medium 936 can be distributed over a conventional computer network via the network interface 935a where the system embodied by the computer readable code can be stored and executed in a distributed fashion. For example, in some embodiments, one or more components of the system 910 can be coupled to send and/or receive data through a local area network ("LAN") 939a and/or an internet coupled network 939b (e.g., such as a wireless internet). In some further embodiments, the networks 939a, 939b can include wide area networks ("WAN"), direct connections (e.g., through a universal serial bus port), or other forms of computer-readable media 936, or any combination thereof.

In some embodiments, components of the networks 939a, 939b can include any number of user devices such as personal computers including for example desktop computers, and/or laptop computers, or any fixed, generally non-mobile internet appliances coupled through the LAN 939a. For example, some embodiments include one or more of personal computers 940, databases 941, and/or servers 942 coupled through the LAN 939a that can be configured for any type of user including an administrator. Other embodiments can include personal computers coupled through network 939b. In some further embodiments, one or more components of the system 210 can be coupled to send or receive data through an internet network (e.g., such as network 939b). For example, some embodiments include at least one user 931a, 931b, is coupled wirelessly and accessing one or more software modules of the system including at least one enterprise application 938 via an input and output ("I/O") device 937c. In some other embodiments, the system 210 can enable at least one user 931a, 931b, to be coupled to access enterprise applications 938 via an I/O device 937c through LAN 939a. In some embodiments, the at least one user 931a, 931b can comprise a user 931a coupled to the system 910 using a desktop computer 940, and/or laptop computers, or any fixed, generally non-mobile internet appliances coupled through the internet 239b. In some further embodiments, the user can comprise a mobile user 931b coupled to the system 910. In some embodiments, the user 931b can use any mobile computing device 931c to wireless coupled to the system 910, including, but not limited to, personal digital assistants, and/or cellular phones, mobile phones, or smart phones, and/or pagers, and/or digital tablets, and/or fixed or mobile internet appliances.

Any of the operations described herein that form part of the system are useful machine operations. The system also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the system can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

The phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

It is to be understood that the system is not limited in its application to the details of construction and the arrangement of components set forth in the previous description or illustrated in the drawings. The system is capable of other embodiments and of being practiced or of being carried out in various ways. The disclosure is presented to enable a person skilled in the art to make and use embodiments of the system. Various modifications to the illustrated embodiments will be readily apparent to those skilled in the art, and the generic principles herein can be applied to other embodiments and applications without departing from embodiments of the system. In addition, many modifications may be made to adapt to a particular situation, indication, material and composition of matter, process step or steps, without departing from the spirit and scope of the present presently disclosed embodiments. All such modifications are intended to be within the scope of the claims appended hereto.

Thus, embodiments of the system are not intended to be limited to embodiments shown, but are to be accorded the widest scope consistent with the principles and features disclosed herein. The detailed description is to be read with reference to the figures, in which like elements in different figures have like reference numerals. The figures, which are not necessarily to scale, depict selected embodiments and are not intended to limit the scope of embodiments of the system. Skilled artisans will recognize the examples provided herein have many useful alternatives and fall within the scope of embodiments of the system.

What is claimed is:

1. A non-transitory computer-readable medium storing instructions configured and arranged for encrypting information passed between application programing interface (API) caller and API logic contained within an API, the instructions comprising:
    determining, by one or more processors, at least one API attribute for use by the API logic that implements a functionality of the API;
    collecting and aggregating, by the one or more processors, entropy from at least one entropy source;
    performing, by the one or more processors, a cryptographic operation using the aggregated entropy on the at least one API attribute before execution of an API calling operation wherein the API is called by the API caller that enables execution of the API logic, a result of said cryptographic operation comprising at least one logic cryptographic parameter;
    passing, by the one or more processors, the at least one logic cryptographic parameter by the API caller to the API, during execution of the API calling operation; and
    performing, by the one or more processors, an API operation when the at least one logic cryptographic parameter has passed by the API caller to the API, the API operation including decryption of the at least one logic cryptographic parameter and execution of the API logic using an API attribute included in the at least one decrypted logic cryptographic parameter.

2. The non-transitory computer-readable medium of claim 1,
    wherein the at least one API attribute comprises one or more of at least one encrypted parameter value, at least one unencrypted parameter value, at least one encrypted return value, at least one unencrypted return value, at least one encrypted binary large object (BLOB) memory allocation value, and at least one unencrypted BLOB memory allocation value;
    wherein the at least one entropy source comprises at least one of environmental entropy, static entropy, and parameter entropy;
    wherein the cryptographic operation comprises at least one of an encryption operation and a decryption operation;
    wherein performing the cryptographic operation comprises:
        generating a cryptographic key using the aggregated entropy, and
        performing a cryptographic transformation on the at least one API attribute to obtain the at least one logic cryptographic parameter;
    wherein performing an API operation comprises at least one of:
        sending at least one logic cryptographic parameter to the API caller, and
        executing the API logic using the at least one logic cryptographic parameter.

3. The non-transitory computer-readable medium of claim 2,
wherein the parameter entropy comprises at least one attribute associated with the at least one API attribute.

4. The non-transitory computer-readable medium of claim 2,
wherein collecting and aggregating the entropy from the at least one entropy source comprises generating a binary large object (BLOB) with a BLOB memory allocation sufficient to store the at least one API attribute.

5. The non-transitory computer-readable medium of claim 4,
wherein the parameter entropy comprises BLOB entropy derived from the BLOB.

6. The non-transitory computer-readable medium of claim 4,
wherein the BLOB comprises at least one of an encrypted BLOB and an unencrypted BLOB.

7. The non-transitory computer-readable medium of claim 4,
wherein performing the cryptographic operation further comprises:
populating the BLOB memory allocation with the at least one API attribute;
performing the cryptographic transformation on the BLOB to obtain a transformed BLOB;
wherein the at least one logic cryptographic parameter comprises the transformed BLOB.

8. The non-transitory computer-readable medium of claim 7,
wherein sending the at least one logic cryptographic parameter to the API caller comprises sending the transformed BLOB to the API caller.

9. The non-transitory computer-readable medium of claim 7,
wherein executing the API logic using the at least one logic cryptographic parameter comprises executing the API logic using the at least one API attribute stored within the transformed BLOB.

10. A system comprising one or more computers comprising one or more processors and one or more non-transitory computer readable media, the one or more non-transitory computer readable media storing instructions configured and arranged for encrypting information passed between an application programing interface (API) caller and API logic contained within an API, the instructions comprising:
determining, by the one or more processors, at least one API value to be passed from the API caller to the API logic, the API caller enables execution of the API logic that implements a functionality of the API;
collecting and aggregating, by the one or more processors, entropy from at least one entropy source;
performing, by the one or more processors, a cryptographic operation using the aggregated entropy on the at least one API value prior to execution of an API calling operation wherein the at least one API value being passed to the API logic, a result of said cryptographic operation comprising at least one caller cryptographic parameter;
passing, by the one or more processors, the at least one caller cryptographic parameter to the API logic during execution of the API calling operation; and
performing, by the one or more processors, an API operation when the at least one caller cryptographic parameter has passed to the API logic during the execution of the API calling operation, the API operation including decryption of the at least one caller cryptographic parameter and execution of the API logic using the API value included in the at least one decrypted caller cryptographic parameter.

11. The system of claim 10,
wherein the least one API value comprises one or more of at least one encrypted parameter value, at least one unencrypted parameter value, at least one encrypted return value, at least one unencrypted return value, at least one encrypted binary large object (BLOB) memory allocation value, and at least one unencrypted BLOB memory allocation value;
wherein the at least one entropy source comprises at least one of environmental entropy, static entropy, and parameter entropy;
wherein the cryptographic operation comprises at least one of an encryption operation and a decryption operation;
wherein performing the cryptographic operation comprises:
generating a cryptographic key using the aggregated entropy, and
performing a cryptographic transformation on the at least one API value to obtain the at least one caller cryptographic parameter;
wherein performing an API operation comprises at least one of:
sending at least one cryptographic parameter to the API caller, and
executing the API logic using the at least one cryptographic parameter.

12. The system of claim 11,
wherein the parameter entropy comprises at least one attribute associated with the at least one API value.

13. The system of claim 11,
wherein collecting and aggregating the entropy from the at least one entropy source comprises generating a binary large object (BLOB) with a BLOB memory allocation sufficient to store the at least one API value.

14. The system of claim 13,
wherein the parameter entropy comprises BLOB entropy derived from the BLOB.

15. The system of claim 13,
wherein the BLOB comprises at least one of an encrypted BLOB and an unencrypted BLOB.

16. The system of claim 13,
wherein performing the cryptographic operation further comprises:
populating the BLOB memory allocation with the at least one API value; and
performing the cryptographic transformation on the BLOB to obtain a transformed BLOB;
wherein the at least one cryptographic parameter comprises the transformed BLOB.

17. The system of claim 16,
wherein sending the at least one cryptographic parameter to the API caller comprises sending the transformed BLOB to the API caller.

18. The system of claim 16,
wherein executing the API logic using the at least one cryptographic parameter comprises executing the API logic using the at least one API value stored within the transformed BLOB.

19. A method of protecting information passed between an application program interface (API) caller of an API and API logic contained within the API within a domain of a single operating system process, the method comprising steps of:

determining at least one API value to be passed to the API caller that enables execution of the API logic;

collecting and aggregating entropy from at least one entropy source;

performing a cryptographic operation on the at least one API value prior to execution of an API calling operation wherein the at least one API value being passed to the API logic that implements a functionality of the API, a result of said cryptographic operation comprising at least one caller cryptographic parameter;

passing the at least one caller cryptographic parameter to the API logic during execution of the API calling operation; and performing an API operation when the at least one caller cryptographic parameter has passed by to the API logic, the API operation including decryption of the at least one caller cryptographic parameter and execution of the API logic using the API value included in the at least one decrypted caller cryptographic parameter.

20. The method of claim 19, wherein the at least one API value comprises one or more of at least one encrypted parameter value, at least one unencrypted parameter value, at least one encrypted return value, at least one unencrypted return value, at least one encrypted binary large object (BLOB) memory allocation value, and at least one unencrypted BLOB memory allocation value;

wherein the at least one entropy source comprises at least one of environmental entropy, static entropy, and parameter entropy;

wherein the cryptographic operation comprises at least one of an encryption operation and a decryption operation;

wherein performing the cryptographic operation comprises:

generating a cryptographic key using the aggregated entropy, and performing a cryptographic transformation on the at least one API value to obtain the at least one caller cryptographic parameter;

wherein performing an API operation comprises at least one of:

sending at least one caller cryptographic parameter to the API caller, executing the API logic using the at least one caller cryptographic parameter, and wherein the parameter entropy comprises at least one attribute associated with at least one caller cryptographic value.

* * * * *